UNITED STATES PATENT OFFICE.

JOHN WILIE STANSBURY AND JOHN MAURICE HEDRICK, OF OSCEOLA, IOWA.

LINING FOR BURIAL-CASKETS, &c.

SPECIFICATION forming part of Letters Patent No. 283,526, dated August 21, 1883.

Application filed January 27, 1883. (No specimens.)

*To all whom it may concern:*

Be it known that we, J. W. STANSBURY and JOHN M. HEDRICK, of Osceola, in the county of Clarke and State of Iowa, have invented certain new and useful Improvements in Linings for Burial-Caskets, &c.; and we do hereby declare that the following is a full, clear, and exact description of the invention, which will enable others skilled in the art to which it appertains to make and use the same.

The object of our invention is to produce an air-tight lining for coffins and burial-caskets; and to this end it consists in a compound or composition of the following ingredients, to wit: alcohol, three pounds; white lead, four pounds; gum-shellac, three pounds; white glue, one pound, and plaster-of-paris, a suitable quantity. Dissolve the shellac in the alcohol and dissolve the glue in four pounds of water, (boiling.) Add the white lead while the water is boiling, and thicken with plaster-of-paris till the mixture becomes of a consistency like thick paste. Apply to the inside of the coffin and lid with a heavy brush, and, when about half-dry, apply a thin coat of shellac or any suitable paint. After drying, the lining will become very hard, and is then finished. If desired, the same composition may be used for sealing the lid instead of cement or red lead.

We claim and desire to secure by Letters Patent of the United States—

1. The compound or composition for air-tight linings for coffins or burial-caskets, composed of alcohol, white lead, gum-shellac, white glue, water, and plaster-of-paris, mixed in about the proportions set forth.

2. The process for making coffins and burial-caskets air-tight, which consists in lining the inside with a composition composed of alcohol, white lead, gum-shellac, white glue, water, and plaster-of-paris, mixed in about the proportions set forth, and applying a thin coat of shellac or any suitable paint to this lining while in a half-dry state and before it hardens, substantially as and for the purpose herein shown and set forth.

In testimony that we claim the foregoing as our own we have hereto affixed our signatures in presence of two witnesses.

JOHN WILIE STANSBURY.
JOHN MAURICE HEDRICK.

Witnesses:
JOHN M. BROWN,
FRANK H. JOHNSON.